Patented Dec. 16, 1952

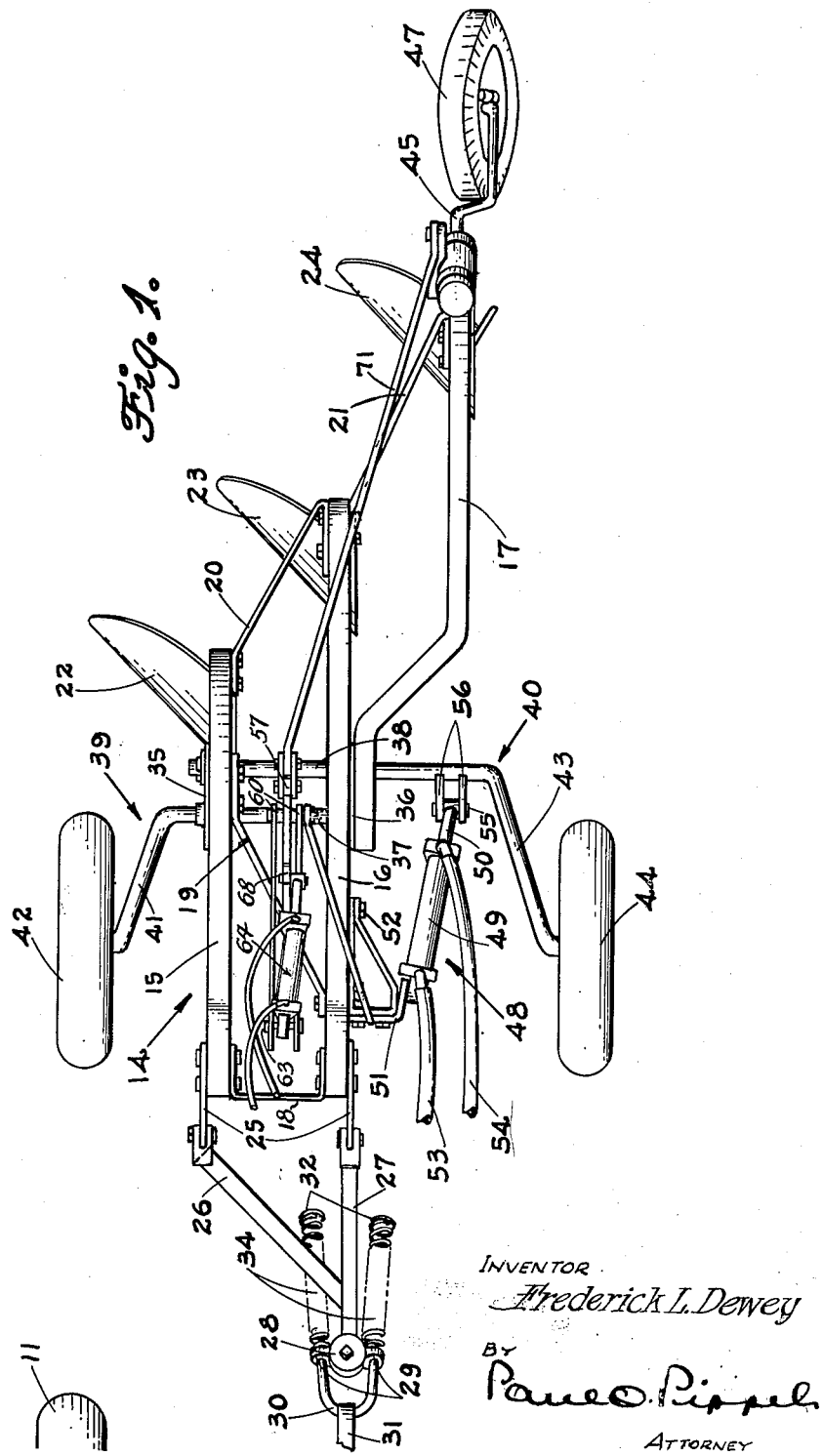

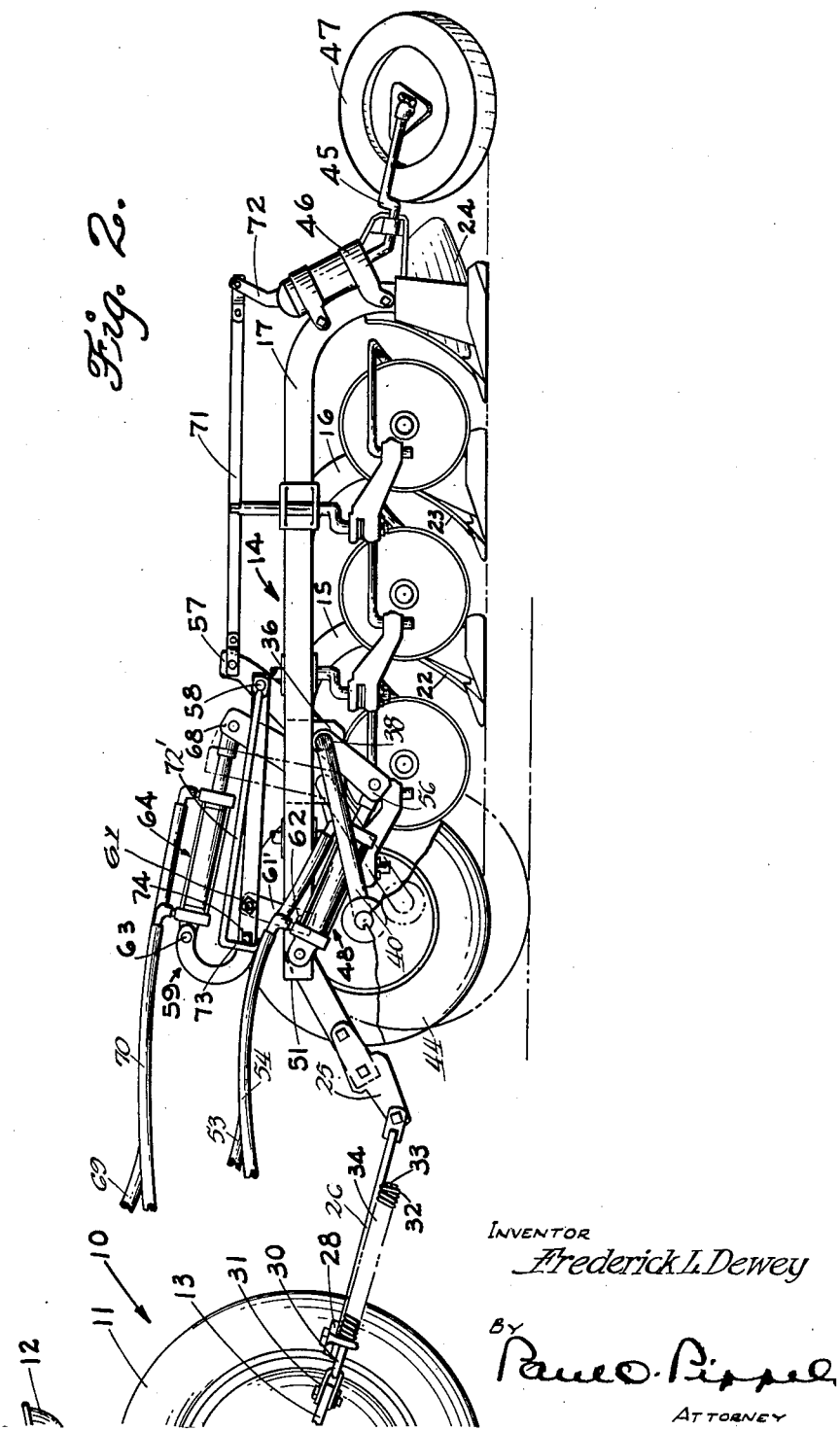

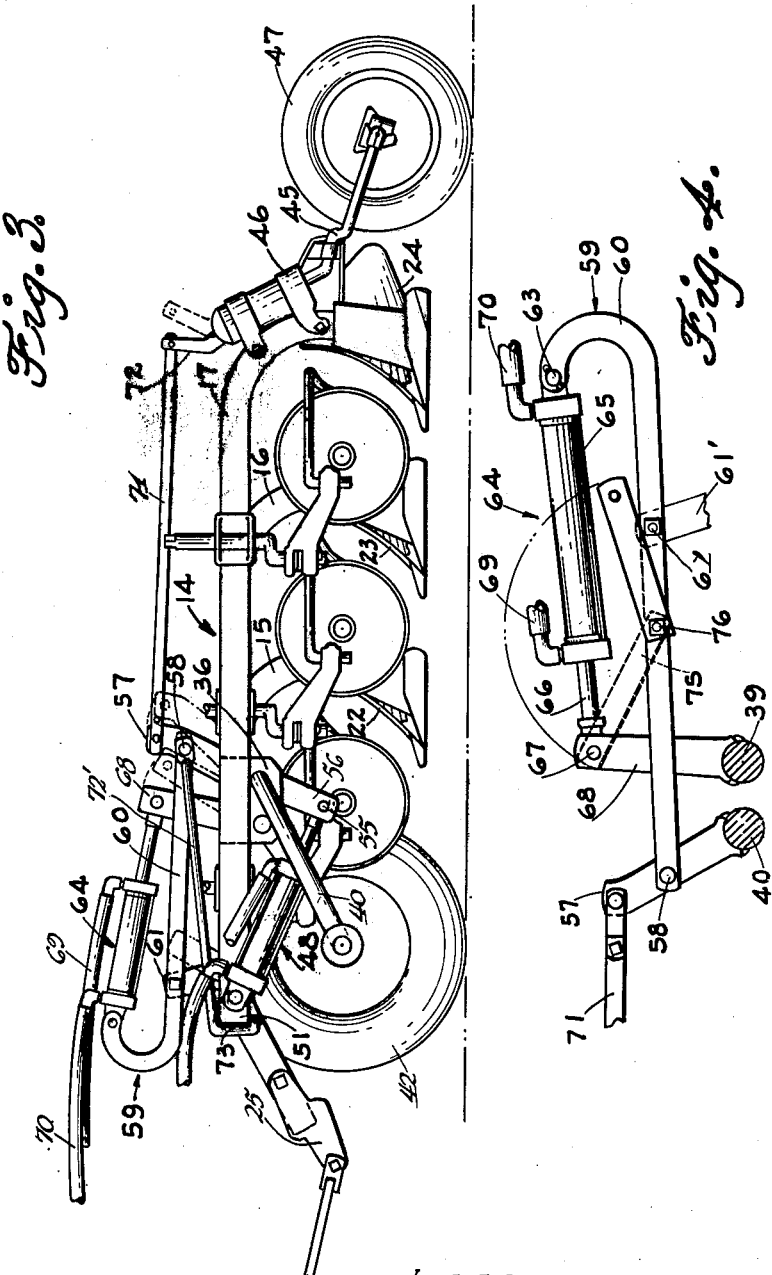

2,621,576

UNITED STATES PATENT OFFICE 2,621,576

SLAVE CYLINDER LIFT FOR TRAIL-BEHIND PLOWS

Frederick L. Dewey, Canton, Ill., assignor to International Harvester Company, a corporation of New Jersey Application January 17, 1947, Serial No. 722,491

4 Claims. (Cl. 97—50)

This invention relates to agricultural implements, and particularly to an implement of the trail-behind type adapted to be drawn by a tractor.

An object of the invention is to provide in a tractor drawn plow or the like, means deriving power from the tractor for controlling the operation of the plow.

Another object of the invention is to provide in a tractor drawn implement having land and furrow wheels, which travel at different vertical levels during operation, means deriving power from the tractor for controlling the relative vertical positions of said wheels.

Another object of the invention is to provide in a tractor drawn plow having land and furrow wheels, means deriving power from the tractor for vertically moving the plow frame with respect to the supporting wheels to raise and lower the plow, and means for leveling or independently controlling the operation of said wheels.

Other objects and advantages of the invention will become clear from the following detailed description when read in conjunction with the accompanying drawings, wherein:

Figure 1 is a plan view of a tractor drawn trail-behind moldboard plow embodying the features of the present invention;

Figure 2 is a view in side elevation of the moldboard plow in lowered position with the plow bottoms resting upon the ground.

Figure 3 is a view similar to Figure 2 showing the plow in raised or transport position; and, Figure 4 is a detail showing a portion of the lifting mechanism and the means by which the plow may be locked in transport position.

The plow of the present invention is power operated and is adapted to be drawn behind a tractor generally indicated at 10, which is provided with a conventional power plant (not shown), rear drive wheels 11, a driver's seat 12, and a draw bar 13.

The plow with which the present invention is concerned comprises a frame generally indicated at 14 which includes laterally spaced longitudinally extending beams 15, 16, and 17, the forward ends of the beams 15 and 16 being in transverse alignment and the rear end of beam 16 being offset rearwardly from the rear end of beam 15. Beams 15 and 16 are connected adjacent their forward ends by a brace 18 and at their rear portions by braces 19 and 20. Beam 17 is secured to the side of beam 16 intermediate its ends and is laterally spaced and rearwardly offset therefrom. The rear portion of beam 17 is secured to beam 16 by a brace 21.

The rear ends of beams 15, 16, and 17 are curved downwardly and upon their lower ends are mounted plow bottoms 22, 23, and 24, which are laterally and rearwardly offset from each other in the manner shown in Figure 1. The forward ends of beams 15 and 16 have secured thereto and projecting forwardly therefrom hitch plates 25 to which are pivotally secured hitch members 26 and 27. Hitch member 27 has secured to its forward end a member 28 having literally extending ears 29 apertured to receive the rearwardly extending arms of a U-shaped bolt 30 which is connected by a clevis 31 to the draw bar 13 of the tractor. The arms of the U-bolt 30 are slidable in the openings in the ears 29 and the ends of the arms are provided with washers 32 secured thereon by nuts 33. Springs 34 surrounded the arms of the bolt 30 between the ears 29 and the washers 32. A spring hitch is thus provided which accommodates resilient longitudinal movement of the plow with respect to the tractor.

Secured to the sides of the beams 15 and 16 are depending plates 35 and 36 respectively. These plates provide for the journaling of the parallel transverse portions 37 and 38 of a pair of crank axles 39 and 40. Crank axle 39 has a downwardly and forwardly bent portion 41 upon which is journaled a furrow wheel 42, and crank axle 40 has a similarly downwardly and forwardly bent portion 43 upon which is mounted a land wheel 44. Axle 45 is carried by a bracket 46 at the rear end of the beam 17 and serves for the mounting of a castering rear furrow wheel 47. Furrow wheels 42 and 47 and land wheel 44 thus serve to support the plow frame 14.

The plow frame 14 carrying the plow bottoms 22, 23, and 24 is raised and lowered between operating and transport positions by mechanism which includes a hydraulic ram unit generally indicated at 48 and including a cylinder 49 and a piston rod 50. Cylinder 49 is pivotally mounted at its forward end upon a bracket 51 affixed to the side of beam 16 by bolts 52. The hydraulic cylinder and piston or ram unit 48 is preferably of the double acting type supplied with fluid under pressure by hose lines 53 and 54. The piston rod 50 is pivotaly mounted upon a pin 55 carried by the rock arms 56 secured to and depending from the transverse portion 38 of the crank axle 40. Fluid is supplied through the lines 53 and 54 to the cylinder unit 48 to operate the piston 50 from a source of fluid pressure (not shown) upon the tractor operated by the tractor power plant and under the control of the tractor operator. The pressure system upon the tractor may be of any known type whereby the fluid supplied to the cylinder 49 may be controlled to lock the piston 50 in any desired position of extension from the cylinder 49.

Operation of the cylinder and piston unit 48 in a direction to extend the piston rod 50 will cause the crank axle 40 to rotate in an anti-clockwise direction as viewed in Figs. 2 and 3 to raise the plow from the operating position shown in Figure 2 to the transport position shown in Figure 3.

Crank axles 39 and 40 are connected together so that power supplied through the ram unit 48 to rock the axle 40 is transmitted to the axle 39 to simultaneously rock the latter and move the furrow wheel 42 relative to the plow frame 14. The land and furrow wheels are thus operated together to raise and lower the plow. The mechanism by which the crank axles 39 and 40 are connected for simultaneous rocking thereof includes an arm 57 secured to and extending generally upwardly from the transverse portion 38 of the crank axle 40 at a location between beams 15 and 16. Rocking of the crank axle 40 thus rocks arm 57 forwardly and rearwardly. Rock arm 57 is provided intermediate its length with a pivot pin 58 upon which is pivoted one end of a bracket 59 comprising laterally spaced members 60 which extend forwardly and are provided intermediate their ends with a pivot pin 61 to which is pivotally connected the upper end of a link 61', the lower end of which is pivotally connected at 62 to an extension of the brace 19. Bracket 59 is thus movable longitudinally of the plow upon rocking of the arm 57 by the swinging of the land wheel 44 in a generally vertical direction to raise and lower the plow.

The forward ends of the members 60 of the bracket 59 are upwardly curved in an arc and the ends thereof have mounted therebetween a pivot pin 63 upon which is mounted one end of a hydraulic ram unit 64 comprising a cylinder 65 having slidable therein a piston rod 66 which in turn is pivotally connected to a pin 67 at the upper end of rock arm 68 secured to and projecting upwardly from the transverse portion 37 of the crank axle 39. Hydraulic cylinder and piston unit 64 is similar to the unit 48 in every respect and is supplied with fluid through hoses 69 and 70 from the tractor power source. The piston and cylinder units 48 and 64 are independently operable and since, as pointed out before, the piston 50 and 66 thereof respectively may be held in any desired position with respect to the cylinders 49 and 65, the unit 64 thus serves as a rigid connecting link between the bracket 59 and the rock arm 68. Thus movement of the rock arm 57 is transmitted through the bracket 59 and the ram unit 64 to simultaneously rock the arm 68 and therefore the furrow wheel 42 which is mounted thereon.

Arm 57 has pivotally connected to the upper end thereof the forward end of a longitudinally extending link 71, the rear end of which is connected to the upper ends of an arm 72 suitably connected to the axle 45 to rock the latter in a generally longitudinally extending plane and thus vertically swing the rear furrow wheel 47 to raise and lower the rear end of the plow frame. Thus vertical swinging movement of the land wheel 44 is transmitted to both the front furrow wheels 42 and the rear furrow wheels 47. In moving the plow frame between operating and transport positions the rear furrow wheel 47 is moved between the operating position shown in Figure 2 to the transport position shown in Figure 3.

In the operating position of the plow with the plow bottoms opening a furrow in the ground the furrow wheel 42 travels in a previously made furrow while land wheel 44 travels upon the unplowed ground. It is therefore necessary at times to adjust the relative vertical positions of the land and furrow wheels in order to properly level the plow. This is accomplished by independently operating the hydraulic cylinder and piston unit 64. Operation of the cylinder and piston unit 64 rocks the arm 68 on crank axle 39 to swing the furrow wheel 42 in a generally vertical direction with respect to the plow frame and since the pivot point 63 remains stationary the crank axle 39 is rocked independently of the crank axle 40.

The hydraulic cylinder and piston units 48 and 64 are readily removable from the plow by removal of the pivot pins upon which they are mounted, and it is often desirable that these units be removed from the plow in order that they may be used for other purposes or when it is desired to store the plow. Since the plow is transported and preferably stored in transport or raised position of the plow bottoms with respect to the supporting wheels, means are provided for holding the plow in its raised position upon disabling or separation of the ram units therefrom. The land wheel may be locked in its raised position so that the cylinder units 48 may be removed, by a mechanism comprising a link 72' pivoted upon the pin 58 mounted upon the arm 57. When the plow is in lowered position as indicated in Figure 2, the forward end of the link 72' which is bent into a hook portion 73 is placed upon a bolt 74 carried by the bracket 59. Upon raising the plow to transport position and removing the cylinder and piston units 48 therefrom, the hook portion 73 of the link 72' is placed in front of and hooked about the transverse portion of bracket 51 secured to the side of the beam 16. In this position with ram unit 48 removed, the operation of the ram unit 64 is not affected. Therefore, unit 64 is still operable to raise and lower the furrow wheel 42 independently of the land wheel 44.

Mechanism for locking furrow wheel 42 in its transport position upon disabling or removal of the ram unit 64 comprises a link 75 pivoted at its lower end at 76 upon the bracket 59 and at its upper end upon the pivot pin 67 of the upper end of rock arm 68. When the plow is in operating position, of course, the link 75 occupies the full line position indicated in Figure 4. The link 75 thus serves to lock the furrow wheel in its raised position to permit removal of the ram unit 64. It may be noted, however, that if independent operation of the furrow wheel 42 is not desired the locking of arm 68 to the bracket 59 by means of the link 75 does not prevent the operation of the furrow wheel by actuation of the ram unit 48. In other words, if it is desired to remove the ram unit 64, the placing of link 75 in its locked position locks the rock arms 57 and 68 together through the actuation of the ram unit 48.

It is believed that the operation of the plow of the present invention will be clearly understood from the foregoing description. It should be understood, however, that modifications may be made therein without departing from the spirit of the invention or the scope of the appended claims.

What is claimed is:

1. In a trail-behind plow adapted for connection to a tractor having a source of fluid pressure, a frame, earth-working tools carried by the frame, crank axles mounted on the frame for swinging movement in a vertical plane, land and furrow wheels carried by said axles for supporting the frame, the furrow wheel axle being mounted on the frame for movement independently of the land wheel to level the plow, interconnecting means between the land and furrow wheel axles for simultaneous movement thereof to raise and lower the plow, including arms on the land and furrow wheel axles, a fluid cylinder and piston unit connecting said arms and serving to transmit motion from the land wheel crank axle to the furrow wheel crank axle, another fluid cylinder and piston unit mounted on the frame and connected to the land wheel crank axle for simultaneously swinging the land and furrow wheel crank axles to raise and lower the frame, means supplying fluid from the tractor pressure source to the last mentioned cylinder to operate the latter, means supplying fluid separately to the first mentioned cylinder to operate the furrow wheel crank axle independently of the land wheel crank axle, whereby the vertical position of the furrow wheel with respect to the land wheel may be varied, and optionally operable link means effectively connecting said axles for locking the furrow wheel axle to the land wheel axle upon removal of the cylinder for the furrow wheel crank axle.

2. In a trail-behind plow adapted for connection to a tractor having a source of fluid pressure, a frame, earth-working tools carried by the frame, crank axles mounted on the frame for swinging movement in a vertical plane, land and furrow wheels carried by said axles for supporting the frame, the furrow wheel axle being mounted on the frame for movement independently of the land wheel to level the plow, interconnecting means between the land and furrow wheel axles for simultaneous movement thereof to raise and lower the plow, including a bracket mounted on the frame for longitudinal movement with respect thereto, means connecting the bracket to the arm on the land wheel crank axle for movement therewith upon swinging the axle to raise and lower the frame, a fluid cylinder pivotally mounted on the bracket for movement therewith and having a piston therein connected to the arm on the furrow wheel crank axle, whereby movement of the land wheel is transmitted to the furrow wheel, a fluid cylinder and piston unit mounted on the frame and connected to the land wheel crank axle to swing the latter, means supplying fluid from the tractor pressure source to the last mentioned cylinder, supplying fluid separately to the first mentioned cylinder to operate the furrow wheel crank axle independently of the land wheel crank axle, and a link effectively connecting said axles for locking the land and furrow wheel axles together for simultaneous operation by the cylinder for the land wheel axle upon removal of the cylinder for the furrow wheel axle, said link serving also to lock the furrow wheel axle against movement relative to the land wheel axle.

3. In a trail-behind plow adapted for connection to a tractor having a source of fluid pressure, a frame, earth-working tools carried by the frame, crank axles mounted on the frame for swinging movement in a vertical plane, land and furrow wheels carried by said axles for supporting the frame, the furrow wheel axle being mounted on the frame for movement independently of the land wheel to level the plow, interconnecting means between the land and furrow wheel axles for simultaneous movement thereof to raise and lower the plow, including a bracket mounted on the frame for longitudinal movement with respect thereto, means connecting the bracket to the arm on the land wheel crank axle for movement therewith upon swinging the axle to raise and lower the frame, a fluid cylinder removably mounted on the bracket for movement therewith and having a piston therein connected to the arm on the furrow wheel crank axle, whereby movement of the lank wheel is transmitted to the furrow wheel, optionally operable connecting means between the bracket and the furrow wheel arm for transmitting motion from the land wheel to the furrow wheel upon removal of said removable cylinder, a fluid cylinder and piston unit mounted on the frame and connected to the land wheel crank axle to swing the latter, means supplying fluid from the tractor pressure source to the last mentioned cylinder, and means supplying fluid separately to the first mentioned cylinder to operate the furrow wheel crank axle independently of the land wheel crank axle.

4. In a trail-behind plow adapted for connection to a tractor having a source of fluid pressure, a frame, earth-working tools carried by the frame, crank axles mounted on the frame for swinging movement in a vertical plane, land and furrow wheels carried by said axles for supporting the frame, the furrow wheel axle being mounted on the frame for movement independently of the land wheel to level the plow, interconnecting means between the land and furrow wheel axles for simultaneous movement thereof to raise and lower the plow, including a bracket mounted on the frame for longitudinal movement with respect thereto, means connecting the bracket to the arm on the land wheel crank axle for movement therewith upon swinging the axle to raise and lower the frame, a fluid cylinder removably mounted on the bracket for movement therewith and having a piston therein connected to the arm on the furrow wheel crank axle, whereby movement of the land wheel is transmitted to the furrow wheel, optionally operable connecting means between the bracket and the furrow wheel arm for transmitting motion from the land wheel to the furrow wheel upon removal of said removable cylinder, a fluid cylinder and piston unit removably mounted on the frame and connected to the land wheel crank axle to swing the latter, optionally operable means for locking the land wheel axle to the frame upon removal of the cylinder and piston unit, means supplying fluid from the tractor pressure source to the last mentioned cylinder, and means supplying fluid separately to the first mentioned cylinder to operate the furrow wheel crank axle independently of the land wheel crank axle.

FREDERICK L. DEWEY.

REFERENCES CITED

The following references are of record in the file of this patent:

UNITED STATES PATENTS

| Number | Name | Date |
|---|---|---|
| 1,969,684 | Bird | Aug. 7, 1934 |
| 2,053,504 | VanSickle | Sept. 8, 1936 |
| 2,226,192 | Barrett | Dec. 24, 1940 |
| 2,283,377 | Lindgren et al. | May 19, 1942 |
| 2,292,961 | Mott | Aug. 11, 1942 |
| 2,344,123 | Brown et al. | Mar. 14, 1944 |